US009534914B1

(12) United States Patent
DeLuca et al.

(10) Patent No.: US 9,534,914 B1
(45) Date of Patent: Jan. 3, 2017

(54) COGNITIVE NEEDS-BASED TRIP PLANNING

(71) Applicant: International Business Machines Corporation, Armonk, NY (US)

(72) Inventors: Lisa Seacat DeLuca, Baltimore, MD (US); James R. Kozloski, New Fairfield, CT (US); Clifford A. Pickover, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/190,750

(22) Filed: Jun. 23, 2016

Related U.S. Application Data

(63) Continuation of application No. 14/967,843, filed on Dec. 14, 2015, now Pat. No. 9,384,661, which is a continuation of application No. 14/749,973, filed on Jun. 25, 2015.

(51) Int. Cl.
| | | |
|---|---|---|
| *G08G 1/0968* | (2006.01) | |
| *G01C 21/34* | (2006.01) | |
| *B60W 40/08* | (2012.01) | |
| *G06N 5/00* | (2006.01) | |

(Continued)

(52) U.S. Cl.
CPC .......... *G01C 21/3484* (2013.01); *B60W 40/08* (2013.01); *G01C 21/34* (2013.01); *G06F 3/00* (2013.01); *G06F 3/048* (2013.01); *G06N 5/00* (2013.01); *G08G 1/096844* (2013.01); *G08G 1/096877* (2013.01)

(58) Field of Classification Search
CPC ..... G01C 21/00; G01C 21/34; G01C 21/3484; G06N 5/00; G08G 1/096877; G08G 1/096838; G08G 1/096844; G06F 3/00; G06F 3/048

See application file for complete search history.

(56) References Cited

U.S. PATENT DOCUMENTS

| | | | |
|---|---|---|---|
| 6,212,470 B1* | 4/2001 | Seymour | G01C 21/3641 340/988 |
| 6,419,629 B1 | 7/2002 | Balkin et al. | |
| 7,384,394 B2 | 6/2008 | Hursh et al. | |

(Continued)

FOREIGN PATENT DOCUMENTS

| | | | | |
|---|---|---|---|---|
| CN | WO 2012088626 A1 * | 7/2012 | ......... | G06K 9/00355 |
| EP | 0811960 A1 | 10/1997 | | |

(Continued)

OTHER PUBLICATIONS

Disclosed Anonymously et al.; "System and methodology for deriving travel routes based on driving styles(s)"; An IP.com Prior Art Database Technical Disclosure; IP.com No. 000211541; IP.com Electronic Publication Oct. 11, 2011; pp. 2.

(Continued)

*Primary Examiner* — Tuan C. To
(74) *Attorney, Agent, or Firm* — Fusheng Xu

(57) ABSTRACT

A route-determination module (RDM) is provided, with the RDM having as input one or more cognitive preferences of a traveler. Further, the RDM receives input on a current or a forecasted cognitive state of the traveler, along with the cognitive load associated with one or more potential routes for traveling to a destination. A recommended route is determined based on the preference(s), state, and/or cognitive load.

1 Claim, 6 Drawing Sheets

(51) Int. Cl.
*G06F 3/00* (2006.01)
*G06F 3/048* (2013.01)

(56) References Cited

U.S. PATENT DOCUMENTS

| | | | |
|---|---|---|---|
| 7,424,363 B2 | 9/2008 | Cheng et al. | |
| 7,840,426 B2 | 11/2010 | Daughtrey et al. | |
| 7,996,345 B2 | 8/2011 | Golding et al. | |
| 8,175,802 B2 | 5/2012 | Forstall et al. | |
| 8,275,348 B2 | 9/2012 | Yen et al. | |
| 8,489,324 B2 * | 7/2013 | Hendrey | G01C 21/3415 701/415 |
| 8,996,304 B2 | 3/2015 | Needham et al. | |
| 9,188,449 B2 | 11/2015 | Biswal et al. | |
| 9,384,661 B1 | 7/2016 | DeLuca et al. | |
| 2003/0050740 A1 | 3/2003 | Fecher et al. | |
| 2009/0048775 A1 | 2/2009 | Okude et al. | |
| 2010/0313152 A1 | 12/2010 | Daughtrey et al. | |
| 2012/0004802 A1 | 1/2012 | Horvitz et al. | |
| 2013/0006521 A1 | 1/2013 | Needham et al. | |
| 2013/0325571 A1 | 12/2013 | Green et al. | |
| 2014/0005923 A1 | 1/2014 | Bank et al. | |
| 2014/0067254 A1 * | 3/2014 | Berlingerio | G01C 21/3423 701/410 |
| 2014/0088871 A1 * | 3/2014 | Gueziec | G01C 21/3492 701/533 |
| 2014/0107923 A1 * | 4/2014 | Gueziec | G01C 21/3492 701/533 |
| 2014/0114572 A1 * | 4/2014 | Kalaboukis | H04W 4/02 701/527 |
| 2014/0278052 A1 | 9/2014 | Slavin et al. | |
| 2014/0278057 A1 | 9/2014 | Berns | |
| 2014/0310610 A1 * | 10/2014 | Ricci | H04W 48/04 715/744 |
| 2015/0068069 A1 * | 3/2015 | Tran | H04B 1/385 36/136 |
| 2015/0168149 A1 * | 6/2015 | Graells | G01C 21/3423 701/527 |
| 2015/0192241 A1 * | 7/2015 | Shannahan | F16M 11/2014 248/178.1 |
| 2015/0260531 A1 | 9/2015 | Ehsani et al. | |
| 2016/0123753 A1 * | 5/2016 | Bankowski | G01C 21/3469 701/465 |
| 2016/0139876 A1 * | 5/2016 | Alves | G06F 3/167 715/728 |

FOREIGN PATENT DOCUMENTS

| | | | | |
|---|---|---|---|---|
| EP | 1727317 A1 | 11/2006 | | |
| EP | 2284768 A3 * | 6/2014 | | G06K 9/00335 |

OTHER PUBLICATIONS

Mell et al,, "The NIST Definition of Cloud Computing", Recommendations of the National Institute of Standards and Technology, NIST Special Publication 800-145, Computer Security Division Information Technology Laboratory, National Institute of Standards and Technology, Gaithersburg, MD 20899-8930, Sep. 2011, 7 pages.

U.S. Appl. No. 14/749,973, filed Jun. 25, 2015 entitled "Cognitive Needs-Based Trip Planning", IBM.

* cited by examiner

COGNITIVE NEEDS-BASED TRIP PLANNING

BACKGROUND

The present invention relates generally to the field of route planning, and more particularly to determining a recommended route.

Generally speaking, route planning refers to finding one or more suggested routes between an origin and a destination. Typically, the route is associated with driving directions for a motor vehicle. Additionally, routes are planned for walking, bicycling, or otherwise for traversing a ground or air path from one physical location to another. Route searches may be optimized on different criteria, for example, fastest, shortest, least changes, and cheapest. Further, route searches may be constrained to leave or arrive at a certain time, to avoid certain waypoints, and so on.

Driving route planning is a very complex process involving, for example, time spent on a route, mileage driven on the route, alternative routes, fuel consumption, and pay toll costs. The most cost-effective route involving several nodes or stopovers may be computed by minimizing the distance traveled and/or time taken.

SUMMARY

In one aspect of the present invention, a method for determining a trip route for a traveler is provided comprising receiving a set of cognitive preferences of the traveler; receiving a current or forecast cognitive state of the traveler; receiving a cognitive load associated with the trip route; and determining a desirable route; wherein the step of determining a desirable route is based on the set of cognitive preferences of the traveler, the current or forecast cognitive state of the traveler, and the cognitive load associated with the trip route.

In another aspect of the present invention, a computer program product for determining a trip route for a traveler is provided comprising a computer readable storage medium having stored thereon: first program instructions programmed to receive a set of cognitive preferences of the traveler; second program instructions programmed to receive a current or forecast cognitive state of the traveler; third program instructions programmed to receive a cognitive load associated with the trip route; and fourth program instructions to determine a desirable route; wherein the step of determining the desirable route is based on the set of cognitive preferences of the traveler, the current or forecast cognitive state of the traveler, and the cognitive load associated with the trip route.

In yet another aspect of the present invention, a computer system for determining a trip route for a traveler is provided comprising: a processor(s) set; and a computer readable storage medium; wherein: the processor set is structured, located, connected, and/or programmed to run program instructions stored on the computer readable storage medium; and the program instructions include: receiving a set of cognitive preferences of the traveler; receiving a current or forecast cognitive state of the traveler; receiving a cognitive load associated with the trip road; and determining a desirable route; wherein the step of determining a desirable route is based on the set of cognitive preferences of the traveler, the current or forecast cognitive state of the traveler, and the cognitive load associated with the trip route.

DETAILED DESCRIPTION

Figure 1:
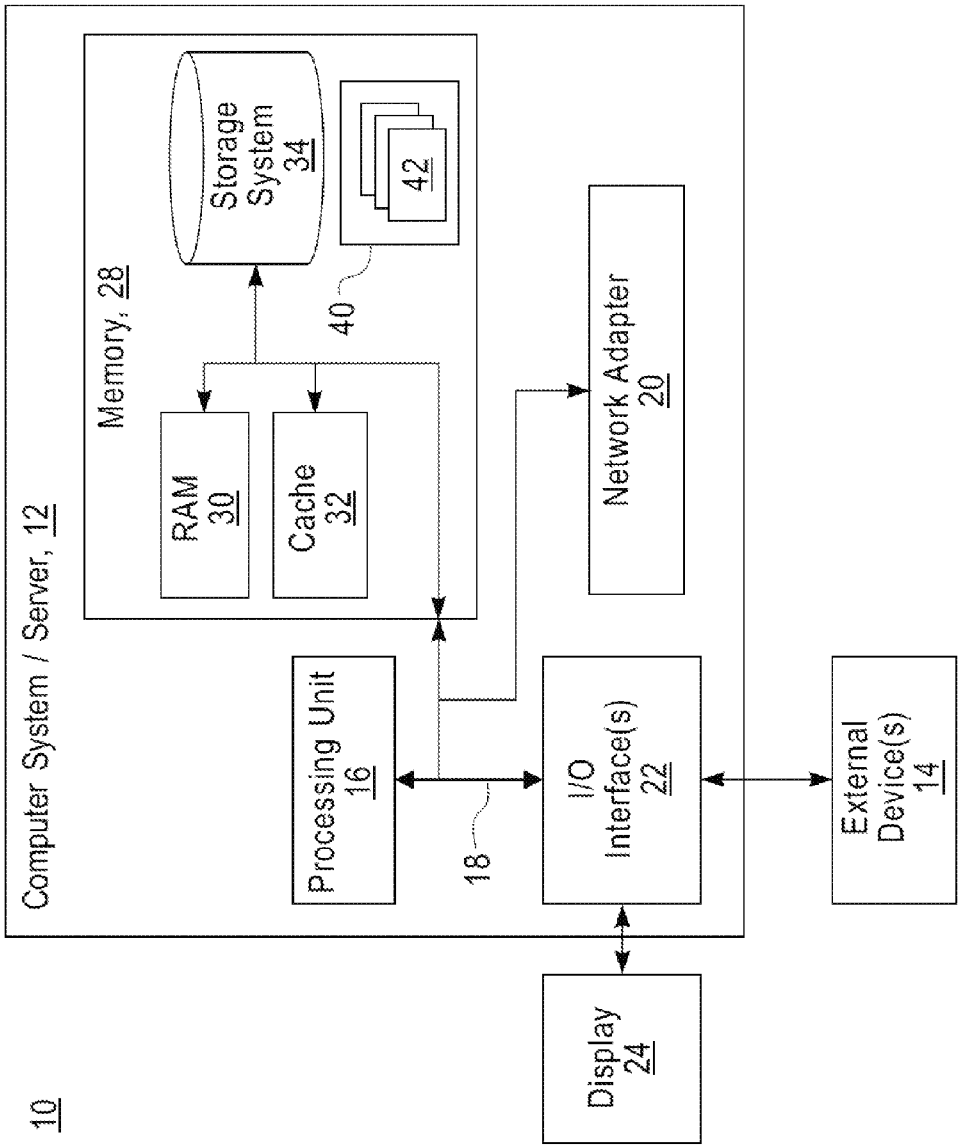
FIG. 1 depicts a cloud computing node used in a first embodiment of a system according to the present invention.

A route-determination module (RDM) is provided, with the RDM having as input one or more cognitive preferences of a traveler. Further, the RDM receives input on a current or a forecasted cognitive state of the traveler, along with the cognitive load associated with one or more potential routes for traveling to a destination. A recommended route is determined based on the preference(s), state, and/or cognitive load. The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium, or to an external computer or external storage device via a network, for example, the Internet, a local area network, a wide area network, and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network, and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture, including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus, or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions, or acts, or carry out combinations of special purpose hardware and computer instructions.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as Follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples include, but are not limited to: microcode, device drivers, redundant processing units, external disk drive arrays, RAID systems, tape drives, and data archival storage systems, etc.

Figure 2:
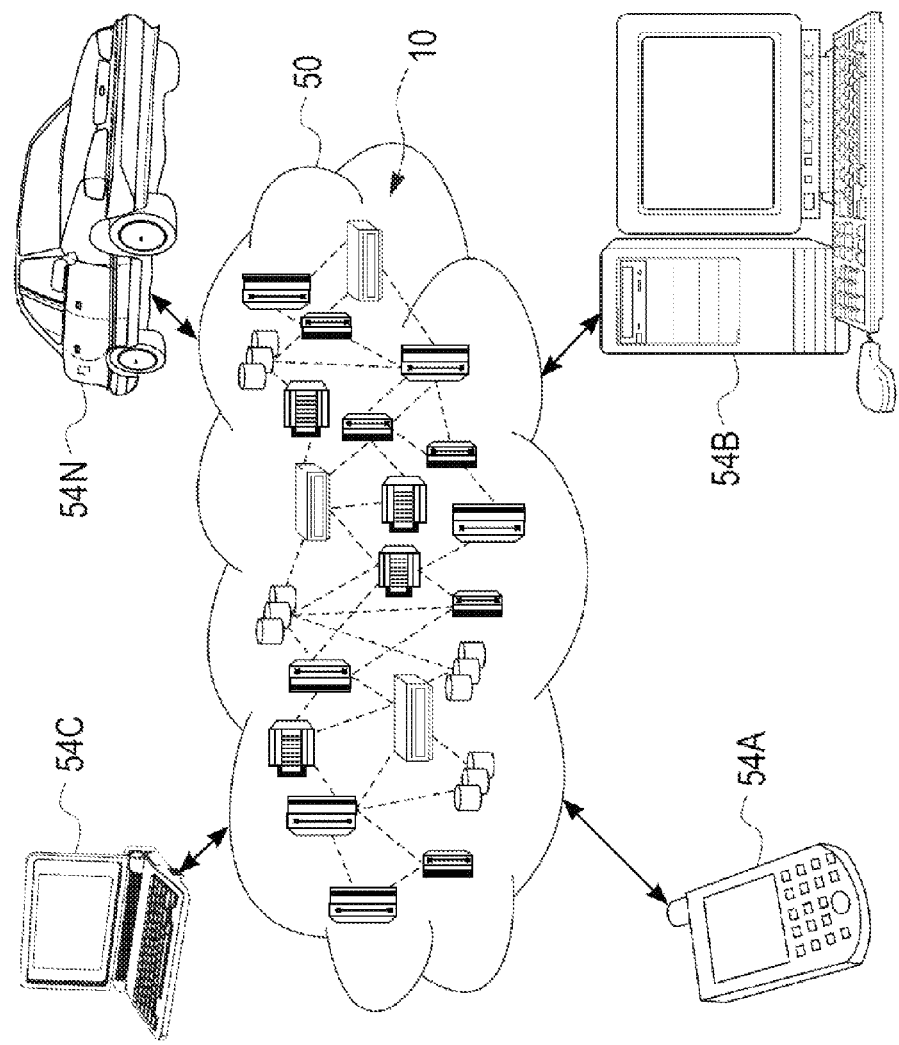
FIG. 2 depicts an embodiment of a cloud computing environment (also called the "first embodiment system") according to the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
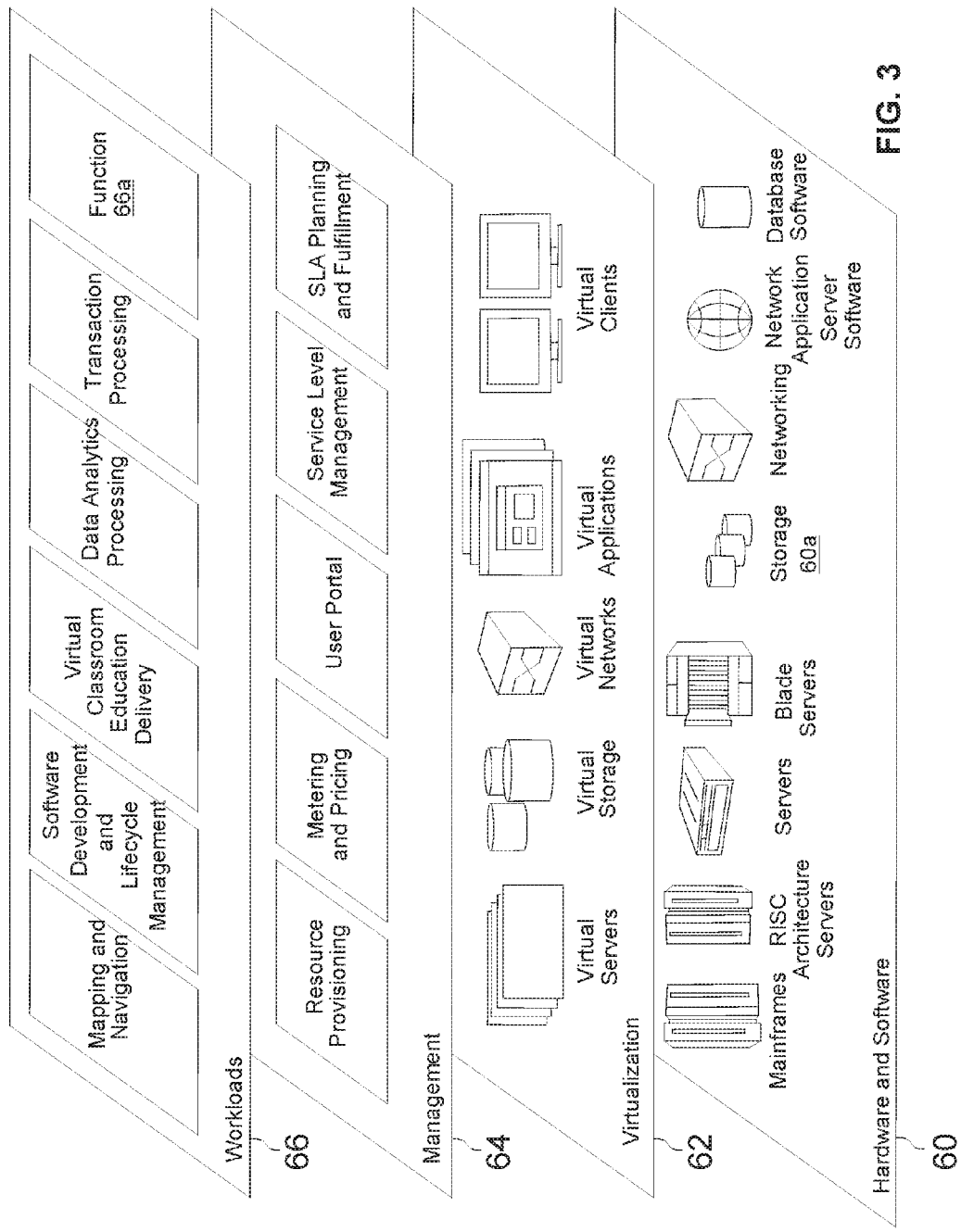
FIG. 3 depicts abstraction model layers used in the first embodiment system.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include mainframes; RISC (Reduced Instruction Set Computer) architecture based servers; storage devices; networks and networking components. In some embodiments software components include network application server software.

Virtualization layer 62 provides an abstraction layer from which the following examples of virtual entities may be provided: virtual servers; virtual storage; virtual networks, including virtual private networks; virtual applications and operating systems; and virtual clients.

In one example, management layer 64 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 66 provides examples of functionality for which the cloud computing environment may be utilized. Examples of workloads and functions which may be provided from this layer include: mapping and navigation; software development and lifecycle management; virtual classroom education delivery; data analytics processing; transaction processing; and functionality according to the present invention (see function block 66*a*).

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Figure 4:
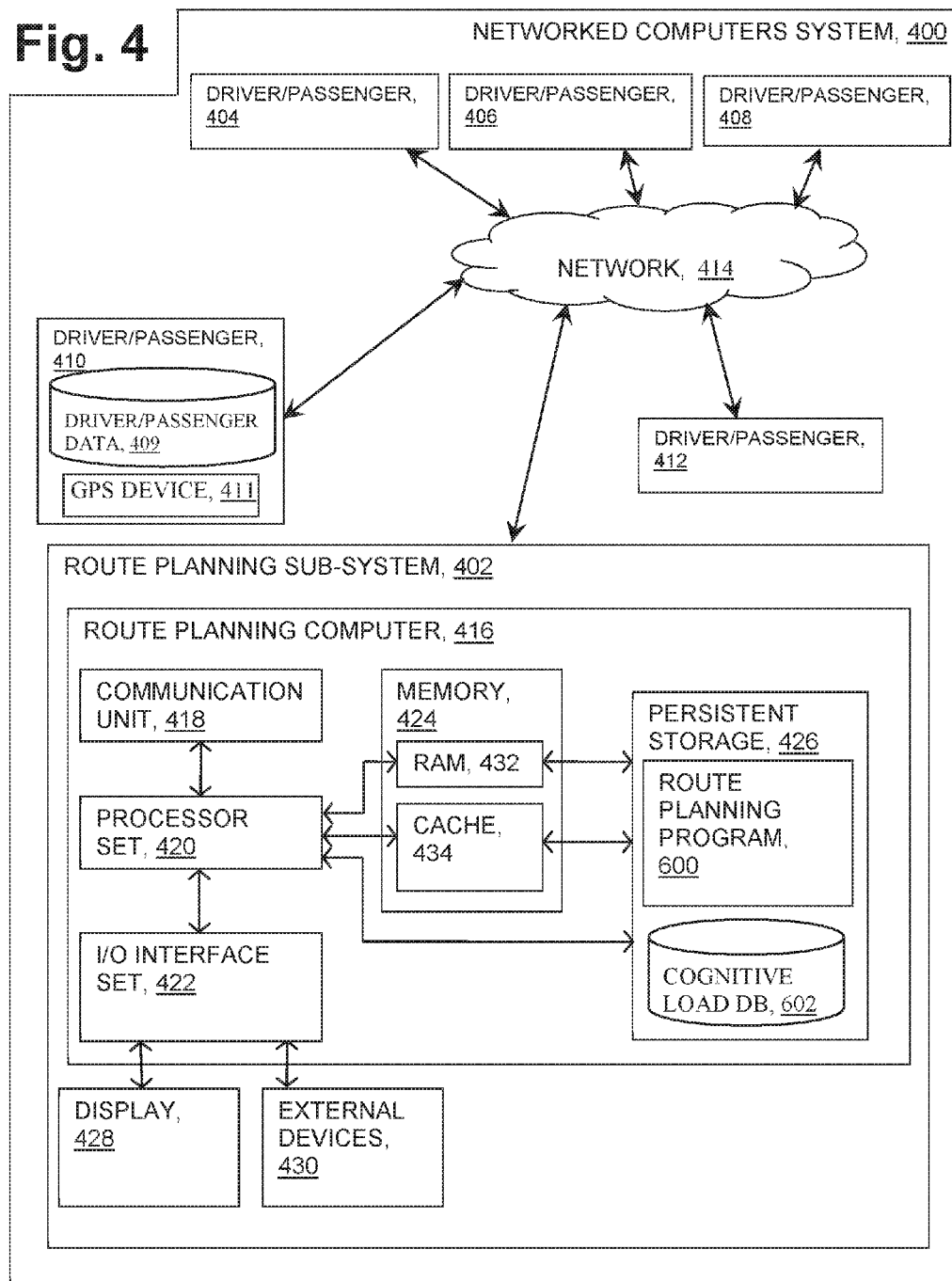
FIG. 4 is a schematic view of a second embodiment of a system according to the present invention.

Some embodiments of the present invention will now be described in detail with reference to the Figures. FIG. 4 is a functional block diagram illustrating various portions of networked computers system 400, in accordance with one embodiment of the present invention, including: route planning sub-system 402; drivers/passengers 404, 406, 408, 410, 412; driver/passenger data 409; global positioning system (GPS) device 411; communication network 414; route planning computer 416; communication unit 418; processor set 420; input/output (I/O) interface set 422; memory device 424; persistent storage device 426; display device 428; external device set 430; random access memory (RAM) devices 432; cache memory device 434; route planning program 600; and cognitive load database 602.

Sub-system 402 is, in many respects, representative of the various computer sub-system(s) in the present invention. Accordingly, several portions of sub-system 402 will now be discussed in the following paragraphs.

Sub-system 402 may be a laptop computer, tablet computer, netbook computer, personal computer (PC), a desktop computer, a personal digital assistant (PDA), a smart phone, or any programmable electronic device capable of communicating with the client sub-systems via network 414. Program 600 is a collection of machine readable instructions and/or data that is used to create, manage, and control certain software functions that will be discussed in detail below.

Sub-system 402 is capable of communicating with other computer sub-systems via network 414. Network 414 can be, for example, a local area network (LAN), a wide area network (WAN) such as the Internet, or a combination of the two, and can include wired, wireless, or fiber optic connections. In general, network 414 can be any combination of connections and protocols that will support communications between server and client sub-systems.

Sub-system 402 is shown as a block diagram with many double arrows. These double arrows (no separate reference numerals) represent a communications fabric, which provides communications between various components of sub-system 402. This communications fabric can be implemented with any architecture designed for passing data and/or control information between processors (such as microprocessors, communications and network processors, etc.), system memory, peripheral devices, and any other hardware component within a system. For example, the communications fabric can be implemented, at least in part, with one or more buses.

Memory 424 and persistent storage 426 are computer readable storage media. In general, memory 424 can include any suitable volatile or non-volatile computer readable storage media. It is further noted that, now and/or in the near future: (i) external device(s) 430 may be able to supply, some or all, memory for sub-system 402; and/or (ii) devices external to sub-system 402 may be able to provide memory for sub-system 402.

Program 600 is stored in persistent storage 426 for access and/or execution by one or more of the respective computer processors 204, usually through one or more memories of memory 424. Persistent storage 426: (i) is at least more persistent than a signal in transit; (ii) stores the program (including its soft logic and/or data), on a tangible medium (such as magnetic or optical domains); and (iii) is substantially less persistent than permanent storage. Alternatively, data storage may be more persistent and/or permanent than the type of storage provided by persistent storage 426.

Program 600 may include both machine readable and performable instructions, and/or substantive data (that is, the type of data stored in a database). In this particular embodiment, persistent storage 426 includes a magnetic hard disk drive. To name some possible variations, persistent storage 426 may include a solid state hard drive, a semiconductor storage device, read-only memory (ROM), erasable programmable read-only memory (EPROM), flash memory, or any other computer readable storage media that is capable of storing program instructions or digital information.

The media used by persistent storage 426 may also be removable. For example, a removable hard drive may be used for persistent storage 426. Other examples include optical and magnetic disks, thumb drives, and smart cards that are inserted into a drive for transfer onto another computer readable storage medium that is also part of persistent storage 426.

Communications unit 418, in these examples, provides for communications with other data processing systems or devices external to sub-system 402. In these examples, communications unit 418 includes one or more network interface cards. Communications unit 418 may provide communications through the use of either, or both, physical and wireless communications links. Any software modules discussed herein may be downloaded to a persistent storage device (such as persistent storage device 426) through a communications unit (such as communications unit 418).

I/O interface set 422 allows for input and output of data with other devices that may be connected locally in data communication with computer 416. For example, I/O interface set 422 provides a connection to external device set 430. External device set 430 will typically include devices such as a keyboard, keypad, a touch screen, and/or some other suitable input device. External device set 430 can also include portable computer readable storage media such as, for example, thumb drives, portable optical or magnetic disks, and memory cards. Software and data used to practice embodiments of the present invention, for example, program 600, can be stored on such portable computer readable storage media. In these embodiments the relevant software may (or may not) be loaded, in whole or in part, onto persistent storage device 426 via I/O interface set 422. I/O interface set 422 also connects in data communication with display device 428.

Display device 428 provides a mechanism to display data to a user and may be, for example, a computer monitor or a smart phone display screen.

Route planning program 600 operates to determine a desirable driving route for a driver/passenger by considering one or more cognitive preferences of the driver/passenger (e.g., desire for easy or hard route), the current or forecast cognitive state of the driver/passenger, along with the cognitive load associated with one or more routes. Specifically, in some embodiments of the present invention, the cognitive-state information regarding the driver/passenger (e.g., recent sleep cycle, and screaming kids in car) is automatically supplied to define a route with an appropriate cognitive load. Program 600 may run on a computer server (e.g., route planning computer 416 in FIG. 4), and driver/passengers 404,406,408,410 and 412 in FIG. 4 may use a computing device, for example a smartphone, to access program 600 through network 414.

Some embodiments of the present invention recognize the following facts, potential problems and/or potential areas for improvement with respect to the current state of the art: (i) conventionally the route planning in navigation tools, such as global positioning system, are based on a driver/passenger's desire to arrive at destination without getting lost in a timely manner while avoiding traffic; (ii) further, conventional route planning may consider passing certain way points where commerce or recreation may be conducted; (iii) there is a real need of a route planning method not only for elderly driver/passengers but for ordinary driver/passengers who prefer a route with low cognitive load, even if the trip is longer, for example when a cognitive state is somewhat impaired by lack of sleep or other factors; and/or (iv) the conventional route planning simply determines or estimates the cognitive load of a route.

A method for specifying a driving route is provided that is determined based on a driver/passenger's cognitive preferences, the driver/passenger's cognitive state, and the driver/passenger's cognitive load associated with the driving route. The cognitive-state information regarding the driver/passenger is automatically supplied to plan a route with an appropriate cognitive load. The cognitive load refers to the amount of mental resources/effort that is required in the working memory. The working memory is the part of our brain that consciously processes information. Further, a multidimensional vector of cognitive states of the driver/passenger and other driver/passengers are defined, along with the notion of planning routes to encourage transitions in a driver/passenger's cognitive state from one state to another more-desirable state.

In some embodiments of the present invention, the cognitive-state information regarding a vehicle driver/passenger (e.g., recent sleep cycle, and disruptive passengers in the vehicle) is automatically fed into a route recommendation engine to plan a trip route with an appropriate level of cognitive load, for example, through a video camera capturing the facial expression of the driver/passenger. Further, some embodiments of the present invention are directed to a multidimensional vector of cognitive states of the driver/passenger and other driver/passengers. Still further, some embodiments of the present invention are directed to planning trip routes to encourage a transition in the cognitive state of a user from one state to another more-desirable state.

Figure 5:
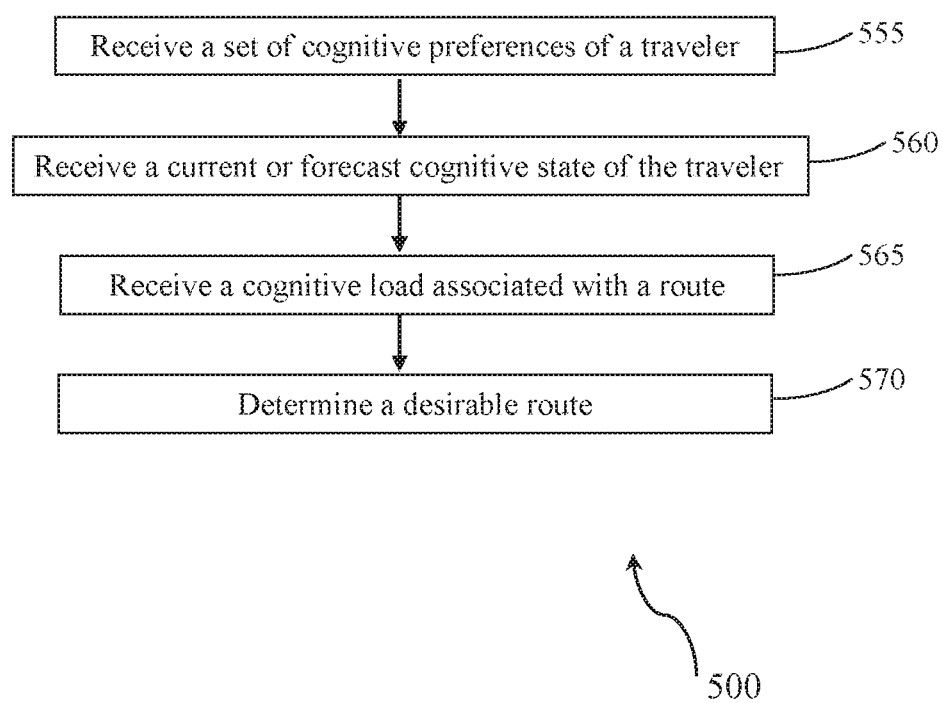
FIG. 5 is a flowchart showing a method performed, at least in part, by the second embodiment system.
Figure 6:
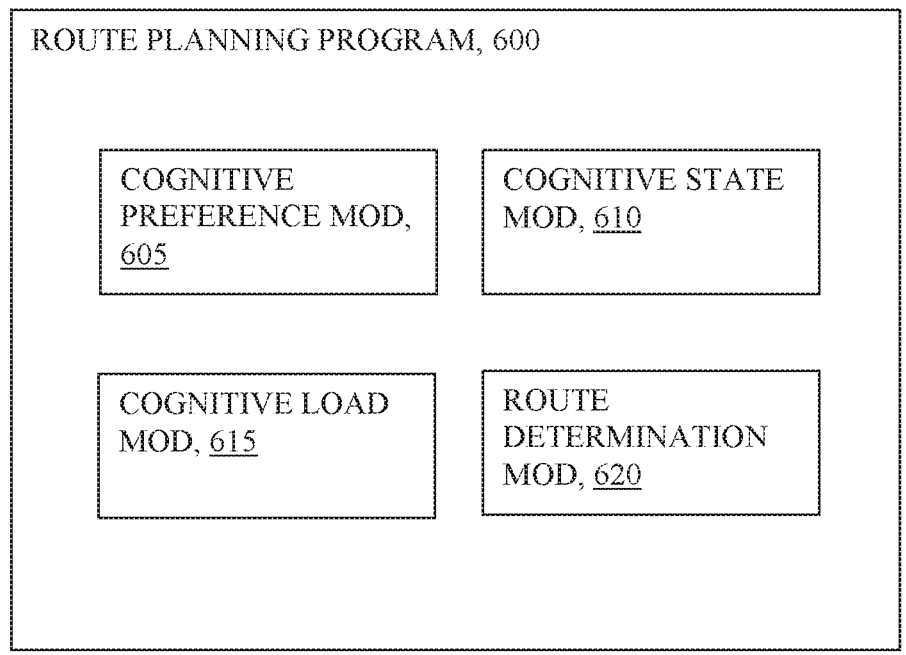
FIG. 6 is a schematic view of a machine logic (for example, software) portion of the second embodiment system.

Referring now to FIG. 5 shows flowchart 500 depicting a first method according to the present invention. FIG. 6 shows program 600 for performing at least some of the method steps of flowchart 500.

Processing begins at step 555, where cognitive preference module "mod" 605 receives a set of cognitive preferences of a traveler. In this example, driver/passenger 410 inputs preference(s) via a user interface of GPS device 411, which is stored in driver/passenger data store 409, and the preference mod receives the preferences from the driver/passenger data store. Alternatively, user preferences are prompted for by preference mod 605. The set of cognitive preferences of the driver/passenger are any of an indication of a driver/passenger's stated desire to have a low-cognitive load (even if the trip takes a little longer), for example, desire for easy or hard routes.

Processing proceeds to step 560, where cognitive state module 610 receives a current cognitive state, or a forecasted cognitive state, of the traveler. In this example, the cognitive state of the driver/passenger is based on factors input by driver/passenger 410 including sleep history and the time of day. A cognitive state may be impaired by lack of sleep or other sleep related deficiencies. Alternatively, the cognitive state mod detects a cognitive state of the driver/passenger via sensors (not shown) or data analytics using recorded state data supporting cognitive state determination. Cognitive state factors that may be used in determining or predicting a traveler's cognitive state include: (i) sleep history; (ii) assessment of occupants in vehicle (e.g., number of occupants, children, spouse); (iii) assessment of who is driving; (iv) real-time assessment that considers clenching of steering wheel; (v) noise level in vehicle (e.g., passenger noise, music playing); (vi) mental condition of traveler; (vii) traveler experience using the means of transportation; (viii) use of medications by the traveler; (ix) use of medications by the passenger(s) in the vehicle; and/or (x) a multidimensional vector of cognitive states of the traveler and/or other travelers.

Processing proceeds to step 565, where cognitive load module 615 determines a cognitive load associated with each of a set of candidate routes. In this example, the load mod evaluates the cognitive load for each potential routes to a selected destination to identify a target route having an appropriate cognitive load. Here, driver/passenger 410 has slept only a few hours over the past three days and it is 10 pm at night, so the appropriate cognitive load for a potential route should have a low, or perhaps, the least cognitive load among the potential routes. The cognitive load of a potential route may be based on: (i) traffic volume; (ii) traffic patterns; (iii) complex intersections; (iv) required fast decisions; and/or (v) aggressive driver/passengers. Further, the cognitive load of a potential route may be based on the needs for crossing multiple lanes of traffic to reach an exit lane. Additionally, the cognitive load may be based on the mechanical/electrical state of the vehicle being used to traverse the route (e.g., some vehicles exhibit malfunctioning performance that increases the cognitive load required to travel routes, and for a walking route, certain travelers may have degrees of injuries that inhibit climbing hills, etc.). Further, the cognitive load may be based on: (i) the occurrence of complex highway interchanges; (ii) roads with traffic circles; (iii) routes with multiple turn requirements; and/or (iv) areas lacking parking. Herein, the term "lacking" may refer to the fact that it may be difficult to find parking along a particular route (e.g., for taking a break) and/or along a street near the destination, and this difficulty may be stressful for some driver/passengers. Even for the same destination (e.g., an office building on the corner of two streets), a first street may be less stressful than a second street near the destination since the first street may have parking or a higher likelihood of free parking spaces. Various methods may exist for determining the number and nature of parking spots.

Processing ends at step 570, where route determination module 620 determines a recommended route from the set of candidate routes for the traveler. In this example, a desirable route is recommended for driver/passenger 410 based on the set of cognitive preferences input by the driver/passenger, the current cognitive state of the driver/passenger, and the cognitive load evaluated for each of the set of candidate routes. Alternatively, as described above, a trip route is determined according to the selected destination and with regard to a traveler-specific cognitive state and the cognitive load assigned to potential routes.

In some embodiments of the present invention, a route planning mechanism is provided by which a route planner is tailored to an individual. The planning mechanism has access to a state transition model of a driver/passenger/user's cognitive and emotional states, and is programmable by a user to plan a route in order to transition a user's cognitive or emotional state from one state to another. For example, a user may be feeling agitated upon leaving the house in the morning and may program a route planning device (e.g., a global positioning system device) according to some embodiments of the present invention with, for example the following parameters: (i) geographical destination: work; (ii) cognitive/emotional destination: greater calm; and/or (iii) time constraint: 1 hour. The user may choose these parameters based on having to arrive at work in time for a morning meeting and a desire to be calmer upon arrival in order to be more effective. Further, the route planning device has access to previous driving behavior, routes taken, and cognitive assessments made by the user's various cognitive modeling capabilities in order to plan the route that is most effective at meeting the transit time constraint, given current road, weather, and traffic conditions, while providing the user an experience consistent with moving the user into a calmer state.

Further, some embodiments of the present invention may plan a trip route according to group cognitive states, such as in planning a route conducive to greater communication, light heartedness, and/or more effective business conditions (e.g., sales or marketing). The route planning device may model each user, and the group as a whole, in the context of current road, weather, and traffic conditions (in the case of a motor vehicle), in order to plan a recommended route that best takes the group to the desired cognitive/emotional state, subject to the geographical and/or time constraints of the planned route.

Some embodiments of the present invention may include one, or more, of the following features, characteristics and/or advantages: (i) the cognitive state of a user may be an input to the route planning, such that a user may specify other requirements for a route including low stress, cognitively stimulating, conducive to thought and deliberation; (ii) the method provided in the present invention is not only for elderly driver/passengers, but for any driver/passenger who prefers a route with a targeted cognitive load regardless of trip route length (such as a low cognitive load, for example, when a cognitive state is somewhat impaired by lack of sleep or other factors); (iii) routes may be planned with a goal to transition a user's cognitive state from one state to another more desired state; and/or (iv) the cognitive state of the driver/passenger may be based on predicting cognitive performance of an individual based on factors including sleep.

Some Helpful Definitions Follow:

Present invention: should not be taken as an absolute indication that the subject matter described by the term "present invention" is covered by either the claims as they are filed, or by the claims that may eventually issue after patent prosecution; while the term "present invention" is used to help the reader to get a general feel for which disclosures herein that are believed as maybe being new, this understanding, as indicated by use of the term "present invention," is tentative and provisional and subject to change over the course of patent prosecution as relevant information is developed and as the claims are potentially amended.

Embodiment: see definition of "present invention" above—similar cautions apply to the term "embodiment."

and/or: inclusive or; for example, A, B "and/or" C means that at least one of A or B or C is true and applicable.

User: includes, but is not necessarily limited to, the following: (i) a single individual human; (ii) an artificial intelligence entity with sufficient intelligence to act as a user or subscriber; and/or (iii) a group of related users or subscribers.

Computer: any device with significant data processing and/or machine readable instruction reading capabilities including, but not limited to: desktop computers, mainframe computers, laptop computers, field-programmable gate array (FPGA) based devices, smart phones, personal digital assistants (PDAs), body-mounted or inserted computers, embedded device style computers, application-specific integrated circuit (ASIC) based devices.

What is claimed is:

1. A computer system comprising:
a processor set; and
a computer readable storage medium;
wherein:
the processor set is structured, located, connected, and/or programmed to run program instructions stored on the computer readable storage medium; and
the program instructions which, when executed by the processor set, cause the processor set to:
receive a request from a driver for a recommended trip route to drive a vehicle from a start location to a destination location;
receive a set of cognitive preferences of a driver from a GPS device including a target cognitive state for the driver;
receive a current cognitive state of the driver, the current cognitive state being based at least in part on a sleep record of the driver for a period ending at the time the current cognitive state is received;
identify a set of trip routes from the start location to the destination location;
define a state transition model of cognitive states for the driver, the state transition model being programmable by the driver for determining the recommended trip route from the set of trip routes based on a cognitive state transition from the current cognitive state to the target cognitive state;
receive a set of cognitive loads respectively corresponding to the set of trip routes, the set of cognitive loads being based at least in part on a number of complex intersections and a record of aggressive drivers for each trip route of the set of trip routes; and
determine the recommended trip route from the set of trip routes based at least in part on the set of cognitive preferences of the driver, the current cognitive state of the driver, and the cognitive loads of the set of cognitive loads respectively corresponding to the set of trip routes.

* * * * *